(No Model.) 2 Sheets—Sheet 1.

J. ALLINGHAM.
HEATING AND COOKING DEVICE.

No. 604,820. Patented May 31, 1898.

Witnesses,
F. F. Mann,
Hiram Barber.

Inventor,
James Allingham
by Jno. F. Ort
Attorney (No Model.) 2 Sheets—Sheet 2.

J. ALLINGHAM.
HEATING AND COOKING DEVICE.

No. 604,820. Patented May 31, 1898.

Witnesses,
D. F. Mann,
Hiram Barber

Inventor,
James Allingham
by Jno. F. Ort
attorney

UNITED STATES PATENT OFFICE.

JAMES ALLINGHAM, OF CHICAGO, ILLINOIS, ASSIGNOR TO THE ALLINGHAM STOVE WORKS, OF ILLINOIS.

HEATING AND COOKING DEVICE.

SPECIFICATION forming part of Letters Patent No. 604,820, dated May 31, 1898.

Application filed March 3, 1897. Serial No. 625,828. (No model.)

*To all whom it may concern:*

Be it known that I, JAMES ALLINGHAM, a citizen of the United States, residing in the city of Chicago, in the county of Cook and State of Illinois, have made new and useful Improvements in Heating and Cooking Devices, of which the following is a specification.

The device herein shown and described is an improvement on the device shown in Letters Patent No. 517,321, dated March 27, 1894, issued to me.

Figure 1:
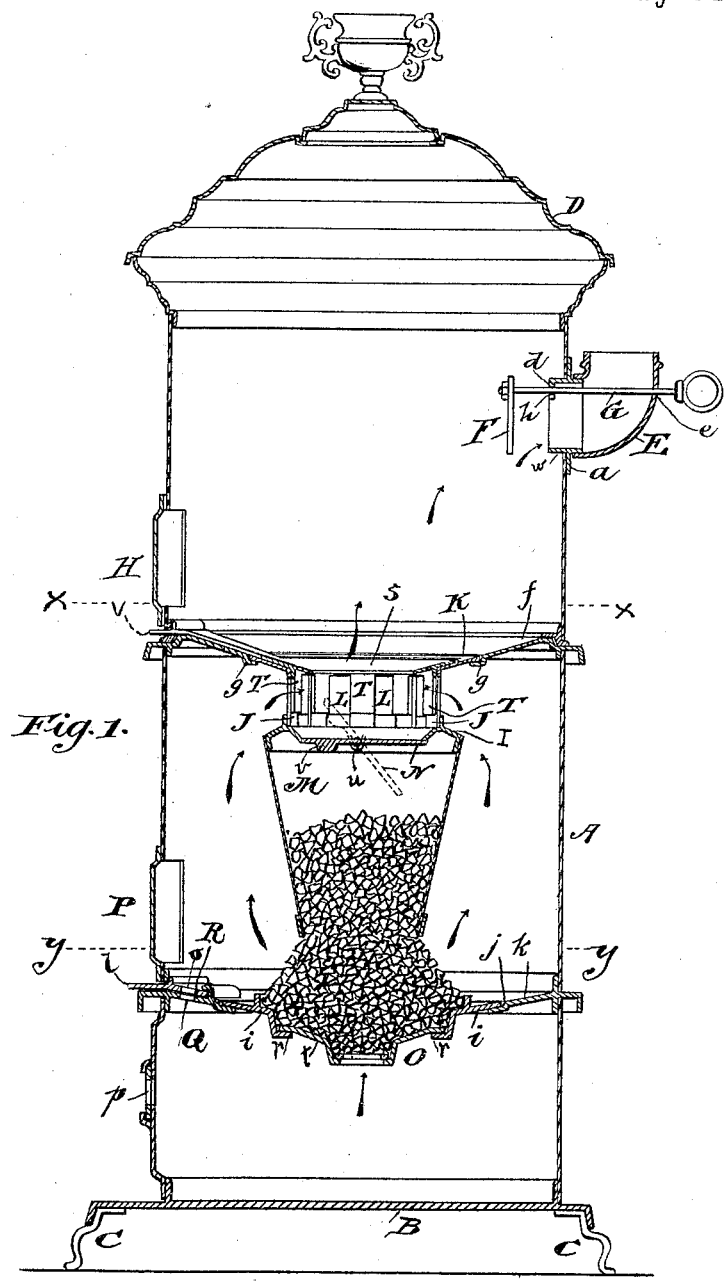
Figure 4:
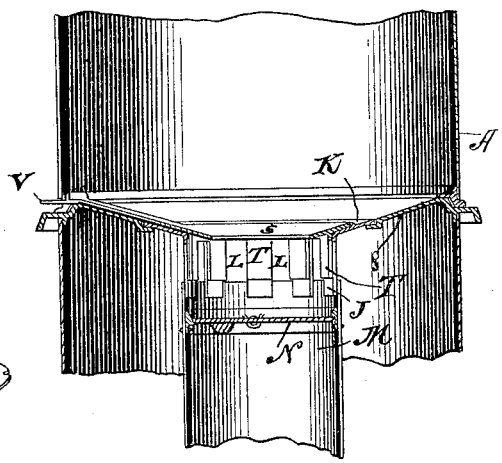
Figure 8:
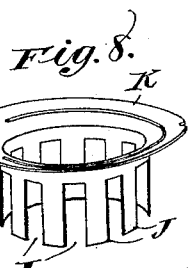
Figure 5:
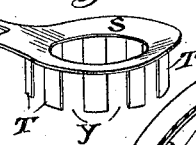
Figure 3:
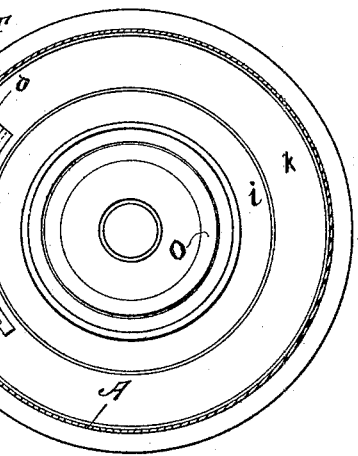
Figure 2:
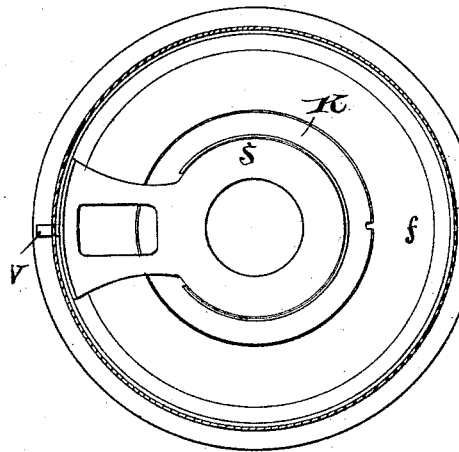
Figure 6:
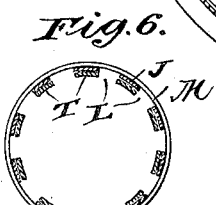
Figure 7:

In the drawings herewith submitted, Figure 1 is a vertical sectional view. Fig. 2 is a plan view through the dotted line X X, Fig. 1. Fig. 3 is a plan view through the dotted line Y Y, Fig. 1. Fig. 4 is a vertical sectional detail showing the upper end of the coal-magazine, register, and cross-partition. Fig. 5 is a detail of rotary register. Figs. 6 and 7 are details showing opening and closing position of rotary register. Fig. 8 is a detail of circular plate with pendants.

Letters are made use of to designate the several parts, as follows:

A is the casing of the stove.

B is the base, resting on the feet C C, and D is the cover.

E is the pipe leading from the interior of the stove.

F is a damper fastened to the rod G. This damper works in a vertical position and fits against the inner end of the exit-pipe E, being moved by the rod G. The collar W has a circular flange $a$ situated upon the exterior surface thereof, and is also provided with the lug $d$, extending downward from the top part of the interior end of the collar. The rod G passes through the hole $e$ in the exit-pipe and through the corresponding hole $h$ in the lug $d$. The rod G is readily moved in and out, thus causing the damper F to open or close the end of the pipe, as desired. The method of constructing an operative damper here shown is in every way preferable to the construction shown and described in my Letters Patent No. 517,321, of March 27, 1894. In the construction shown in said Letters Patent the location of the rod G therein described, extending through the front wall of the casing, was found to be objectionable, while the smoke-flue, extending into the upper chamber of the stove, and the rod $g$, as therein described, were found to be an obstruction to the use of a feed-magazine located above the cross-partition. The rod $g$ and the smoke-flue and its connections, as described in said Letters Patent, were also found to be items of expense, unnecessarily increasing the cost of the stove. To obviate these difficulties, I have adopted the construction of a damper as shown in the accompanying drawings, which I consider cheaper, less complicated in construction, and more satisfactory in operation.

In my damper as shown herein the operating-rod G is withdrawn from the interior of the stove and located in the exit-pipe E and the horizontal smoke-flue or outlet-pipe extending inward from the collar of the stove, as described in said Letters Patent No. 517,321, wholly dispensed with, thus leaving the interior of the upper section of the stove free for the introduction of a feed-magazine when desired, and thus materially reducing the cost of the stove.

H is a door opening into the upper chamber of the stove above the cross-partition, which is composed of two parts—the outer plate $f$ and the inner circular plate K. Through the center of the inner plate K is a circular opening, and from the edge forming this central opening the pendants J J extend downward, leaving an open space between them. This circular plate and pendants are shown in Fig. 8. $g$ is a circular shoulder on outer plate $f$, which supports the inner plate K.

The inner plate K of the cross-partition is liable to become more highly heated than the outer plate, and thus impaired sooner than the outer one. With the partition made of two parts either may be renewed when desired. Moreover, when made of two parts there is greater freedom of expansion and contraction, thus guarding against the breakage which frequently results when the partition is one solid piece of casting.

M is the coal-magazine fastened at its top to the lower ends of pendants J J. At the upper end of the magazine is located the automatically-dumping trap N. This trap is pivotally attached to the magazine M, and the part at one side of the pivot $u$ is weighted, so that when the trap is tilted it will return at once to its normal position. The magazine is located at the center of the casing of the stove and relatively so that the coal does not come in contact with the casing of the stove.

O is the grate upon which the coal rests and is made of two parts—an outer part $k$ and an inner part $i$, resting on the shoulder $j$, similar to the plate K in the cross-partition. The inner plate $i$ is provided with a central opening, and in this opening is located an open-work movable section, upon which the coal rests. The outer portion $k$ of the grate is provided with a series of holes Q Q, which allow air to pass up into the fire-box outside of the coal. A damper R, provided with similar holes $o$ $o$ in size and number, is placed over the plate $k$, and by moving it to the right or left by the handle $l$ the holes Q Q are opened and closed at pleasure.

P is a door leading into the fire-box. A door $p$ is provided for the ash-box below, having a slide to admit or exclude air at pleasure, as is usual in stoves.

S, Fig. 5, is a register-plate provided with vertical valves T T, leaving vertical openings Y between them. This register-plate is placed on the inner circular plate, the vertical valves T T facing the pendants J J. The vertical valves are wide enough to cover the spaces L between the pendants J J. The register-plate has a handle V extending outside through a slot in the casing A, by which it is turned. By turning it a certain distance to the right or left the vertical valves close the openings L L between the pendants. By reversing the movement the vertical valves face the pendants, leaving the spaces open. The register-plate S is also provided with a rib at the base of the handle to prevent the escape of gas through the slot in the casing A.

Coal is fed into the stove through the door H above the cross-partition onto the trap N, which dumps, and it passes into the magazine onto the grate below, when the trap returns to its normal position.

The coal is ignited on the grate, where the primary combustion occurs. The course of the draft is upward, as indicated by the arrows. The cross-partition, composed of the outer plate $f$ and the inner plate K, the pendants J J and the trap N, prevents the unconsumed gases and non-consumed products of combustion from passing directly upward and out of the exit-pipe E. On the contrary, the same are concentrated and compelled to pass through the openings L L into the recess above the trap N, which recess forms a part of the upper combustion-chamber. By this method of concentration I am able to secure a further or secondary combustion of such gases and unconsumed products of combustion as they emerge from the openings L L in their passage upward, and thus to increase the heating capacity of the stove. The upper and lower combustion-chambers can be made of any desired height. The longer they are the greater will be their radiating-surface. Hence stoves of various heating capacities can be made embodying this principle.

In Fig. 6 the openings are shown open. In Fig. 7 they are shown closed.

It will be observed that in this method of constructing the stove I have provided two combustion-chambers, one located in the lower section of the stove and one located in the upper section thereof. These chambers are separated by the plate $f$, the inner plate K, the pendants J J, the trap N, and the valves T T, when the same are closed. When the valves T T are open, there is communication between the combustion-chambers through the openings L L. The coal is placed in the lower chamber, where the primary combustion takes place. In the upper chamber secondary combustion takes place from the concentration of the unconsumed gases arising from the primary combustion in the lower chamber. Hence the heat arising from such secondary combustion is pure economy, as otherwise the gases would remain unconsumed and pass directly through the exit-flue and out at the chimney. There are no air-passages between the combustion-chambers except the vertical openings between the pendants J J or through the fuel-magazine when the trap N is open. There is no combustion of coal above the dumping-trap N, which allows the coal to pass through and then closes automatically.

In Fig. 1 the grate is constructed with the central part dropped down. The inner plate $i$ is provided with a drop-flange $r$, upon which rests the movable section $t$. This forms a pit into which the coal is dropped and definitely locates the burning coal at the center of the grate and away from the casing A of the stove. This drop-flange $r$ can extend downwardly more or less, as desired.

Having thus described the object and purpose of my improvement in heating and cooking devices and its method of construction and operation, what I claim as novel and as of my invention and for which I claim Letters Patent is as follows:

1. The combination with the stove-casing of a grate, a cross-partition above the grate, having a fuel-magazine extending downward from its central portion, said fuel-magazine having a discharge end of such a size relative to the casing, and in such a position with respect to the grate that the fuel supplied therefrom will not spread outward against the walls of the casing; said fuel-magazine being also provided with openings near the top of the same for the passage of the burning gases arising from the grate, and a dumping-trap located in the upper portion of said fuel-magazine and below said openings therein, substantially as described.

2. The combination with the stove-casing and grate of the cross-partition above the grate, the fuel-magazine extending downward from said cross-partition and provided with openings in the upper portion thereof for the passage of burning gases arising from the grate below, a dumping-trap located in the upper section of said fuel-magazine and below said openings, whereby an auxiliary combustion-chamber is formed above said dumping-trap, substantially as described.

3. In a stove, the combination with the casing of a cross-partition made of two parts, an outer and an inner part, which are adapted to expand and contract by heat and cold, independently of each other, a rotary register depending from said cross-partition and an automatically-adjusting trap below said register, substantially as described.

4. In a stove, the combination with the casing, of a cross-partition made of two parts, an outer and an inner part, which are adapted to expand and contract by heat and cold independently of each other, and located above the fire-grate, the inner part of said partition being provided with a central feed-opening, a fuel-magazine depending from said partition and communicating with said central opening, and an automatically-adjusting dumping-trap located below said central feed-opening, substantially as described.

5. In a stove, the combination with the casing, of a cross-partition provided with a central feed-opening, a fuel-magazine depending from said cross-partition and communicating with said opening, an automatically-adjusting dumping-trap below said opening, and a rotating register, provided with lateral openings below said cross-partition and above said dumping-trap, substantially as described.

6. In a stove, the combination with the outer casing, A, of a cross-partition, located above the grate, and composed of the outer plate, $f$, and the inner plate, K, the inner plate, K, being provided with a central opening, to the edges of which central opening are attached a series of pendants, J J, extending downward from the plane of the said cross-partition, and the fuel-magazine, M, located below said cross-partition and attached to the lower ends of the pendants, J J, and the dumping-trap N below said pendants, substantially as described.

7. In a stove, the combination with the outer casing, A, of a cross-partition, located above the grate, and composed of the outer plate, $f$, and the inner plate, K; the said inner plate, K, being provided with a central feed-opening, to the edges of which central opening are attached a series of pendants, J J, extending downward from the plane of said cross-partition, the register-plate, S, provided with the vertical valves, T T, and the fuel-magazine, M, located below said cross-partition and attached to the lower ends of the pendants, J J, and the dumping-trap N below said register, substantially as described.

In witness whereof I have hereunto put my hand this 22d day of February, A. D. 1897.

JAMES ALLINGHAM.

Witnesses:
CAMERON BARBER,
F. W. UPTON.